United States Patent [19]

Okada

[11] Patent Number: 5,285,138
[45] Date of Patent: Feb. 8, 1994

[54] WINDSHIELD WIPER CONTROL WITH TIME SEQUENTIAL INDEXING OF WIPER POSITION

[75] Inventor: Kazukiyo Okada, Kosai, Japan

[73] Assignee: ASMO Co., Ltd., Shizuoka, Japan

[21] Appl. No.: 926,976

[22] Filed: Aug. 7, 1992

[30] Foreign Application Priority Data

Aug. 9, 1991 [JP] Japan .................. 3-200968

[51] Int. Cl.$^5$ .............................. H02P 7/00
[52] U.S. Cl. .................. 318/280; 318/DIG. 2; 15/250.12
[58] Field of Search ............. 318/443, 444, DIG. 2, 318/280-286, 264, 272, 461, 466, 468, 483; 15/250.2, 250.13, 250.15, 250.17, 250.21, 250.22, 250.23, 250.31, 250.34, 250.38, 250.39

[56] References Cited

U.S. PATENT DOCUMENTS

| | | | |
|---|---|---|---|
| 3,721,878 | 3/1973 | Gumbert | 318/443 |
| 4,559,484 | 12/1985 | Hirano | 318/443 |
| 4,585,980 | 4/1986 | Gille et al. | 318/444 |
| 4,670,695 | 6/1987 | Licata et al. | 318/443 |
| 4,700,026 | 10/1987 | Kamiyama et al. | 318/DIG. 2 |
| 4,733,142 | 3/1988 | Bickwell | 318/283 |
| 4,742,280 | 5/1988 | Ishizawa et al. | 318/282 |

*Primary Examiner*—Jonathan Wysocki
*Attorney, Agent, or Firm*—Stetina and Brunda

[57] ABSTRACT

A windshield wiper control system has a motor connected to a shaft for driving a wiper in a normal and a reverse directions. A wiper position detector includes a plurality of detector levers for providing output detection signals indicative of the position of the wiper. A storage device stores combinations of the output detection signals in a time-sequential order. A data generation device arranges the stored output detection signals from the detector, in predetermined time-sequential combinations, and prepares detection data therefrom. An indexing device compares the detection data prepared by the data generation device with corresponding combinations of stored output detection signals, and indexes the relative positions of the wiper resulting from such comparison.

7 Claims, 9 Drawing Sheets

Fig. 2

|  | DDn | | DDn-1 | | DDn-2 | | position |  |
|---|---|---|---|---|---|---|---|---|
|  | S2 | S1 | S2 | S1 | S2 | S1 | | |
| D1→ | 0 | 0 | 1 | 1 | 1 | 0 | passing position of point P3 | PD1 |
| D2→ | 0 | 1 | 0 | 0 | 1 | 1 | intermittent stop position | PD2 |
| D3→ | 1 | 1 | 0 | 1 | 0 | 0 | forward motion region | PD3 |
| D4→ | 1 | 0 | 1 | 1 | 0 | 1 | reverse position | PD4 |
| D5→ | 1 | 1 | 1 | 0 | 1 | 1 | return motion region | PD5 |

Fig. 3

|  | DDn | | DDn-1 | | DDn-2 | | position |  |
|---|---|---|---|---|---|---|---|---|
|  | S2 | S1 | S2 | S1 | S2 | S1 | | |
| D6→ | 1 | 1 | 1 | 0 | 1 | 1 | forward motion region | PD6 |
| D7→ | 0 | 1 | 1 | 1 | 1 | 0 | intermittent stop position | PD7 |
| D8→ | 0 | 0 | 0 | 1 | 1 | 1 | retracted position | PD8 |

Fig. 5
| DDn | | DDn-1 | | DDn-2 | |
|---|---|---|---|---|---|
| S2 | S1 | S2 | S1 | S2 | S1 |
| 1 | 0 | 1 | 1 | 1 | 0 |
← STEP1
| DDn | | DDn-1 | | DDn-2 | |
|---|---|---|---|---|---|
| S2 | S1 | S2 | S1 | S2 | S1 |
|  |  | 1 | 1 | 1 | 0 |
← STEP2
| DDn | | DDn-1 | | DDn-2 | |
|---|---|---|---|---|---|
| S2 | S1 | S2 | S1 | S2 | S1 |
| 0 | 0 | 1 | 1 | 1 | 0 |
← STEP3

| S2 | S1 | position |
|---|---|---|
| 0 | 0 | retracted position |
| 1 | 0 | reverse position |
| 0 | 1 | intermittent stop position |
| 1 | 1 | forward motion and return motion regions |

WINDSHIELD WIPER CONTROL WITH TIME SEQUENTIAL INDEXING OF WIPER POSITION

BACKGROUND OF THE INVENTION

This application claims the priority of Japanese Patent Application No. 3-200968 filed Aug. 9, 1991, which is incorporated herein by reference.

FIELD OF THE INVENTION

The present invention relates to a system for controlling the movement of a wiper for use with vehicles. More particularly, this invention relates to a drive control apparatus for a retractable wiper.

DESCRIPTION OF THE RELATED ART

One conventional control system for a wiper has been described in U.S. Pat. No. 4,673,853. This system includes a motor for driving a wiper and a wiper motion position detector. It further includes a wiper actuation switch and a controller. The controller controls the rotation of the motor, based on the output signals from the detector and the wiper actuation switch. The wiper movement includes an intermittent sweeping action and a retraction action for concealed position.

The detector has a position detector pattern plate on a shaft which is drivably coupled to the motor. The pattern plate includes a plurality of concentric tracks, and a plurality of contacts which are connected to the tracks. When the shaft rotates, a signal corresponding to the shape of the pattern will be generated and fed, via the contacts, to the controller, to thereby specify the position of the wiper. Based on the specified wiper position, the aforementioned intermittent action or the wiper retraction action will be accomplished.

In such a control system, when there are a few wiper positions to be specified, different detection patterns can be formed on the shaft in association with the individual positions. When the number of wiper positions to be specified increases, it will become relatively difficult to form different patterns corresponding to the individual positions, because of the limited space on the shaft.

An increase in the number of the tracks could increase the possible combinations of the signals for the pattern plate. However, such an increase is accompanied by a corresponding increase in the number of contacts. This could render the design relatively more complicated, and to an overall increase in the size of the control system.

SUMMARY OF THE INVENTION

It is therefore an object of the present invention to provide a wiper control system which provides accurate detection of the various wiper positions, and which allows for an increase in the number of detectable wiper positions.

It is another object of the present invention to provide a wiper control system which does not render the detector design more complicated, without an increase in size, even when the number of wiper positions is increased.

To achieve the foregoing objects, a wiper control system of the present invention is provided with a reversible rotor for driving the wiper reciprocatively. This rotor is provided with a position detection plate for providing information corresponding to the wiper position. When the rotor rotates, a detector will interpret this information, and will output corresponding signals. A storage device stores the wiper information in a time-sequential order.

A data generation device arranges the detection output signals from the detector in a time-sequential order to prepare detection data. An indexing device compares the detection data to the position information stored in the storage device, for indexing the positions of the wiper blade.

BRIEF DESCRIPTION OF THE DRAWINGS

The features of the present invention that are believed to be novel are set forth with particularity in the appended claims. The invention, together with the objects and advantages thereof, may best be understood by reference to the following description of the preferred embodiments, together with the accompanying drawings, in which:

FIG. 2 is an example of a table of output signals stored in the system of FIG. 1;

FIG. 3 is another example of a table of output signals stored in the system of FIG. 1;

FIG. 5 is another example, in a tabular form, of the order for handling the time-sequential detection pattern;

DETAILED DESCRIPTION OF THE PREFERRED EMBODIMENT

A wiper control system for a retractable windshield wiper according to a preferred embodiment of the present invention will now be described referring to the accompanying drawings.

Figure 1:
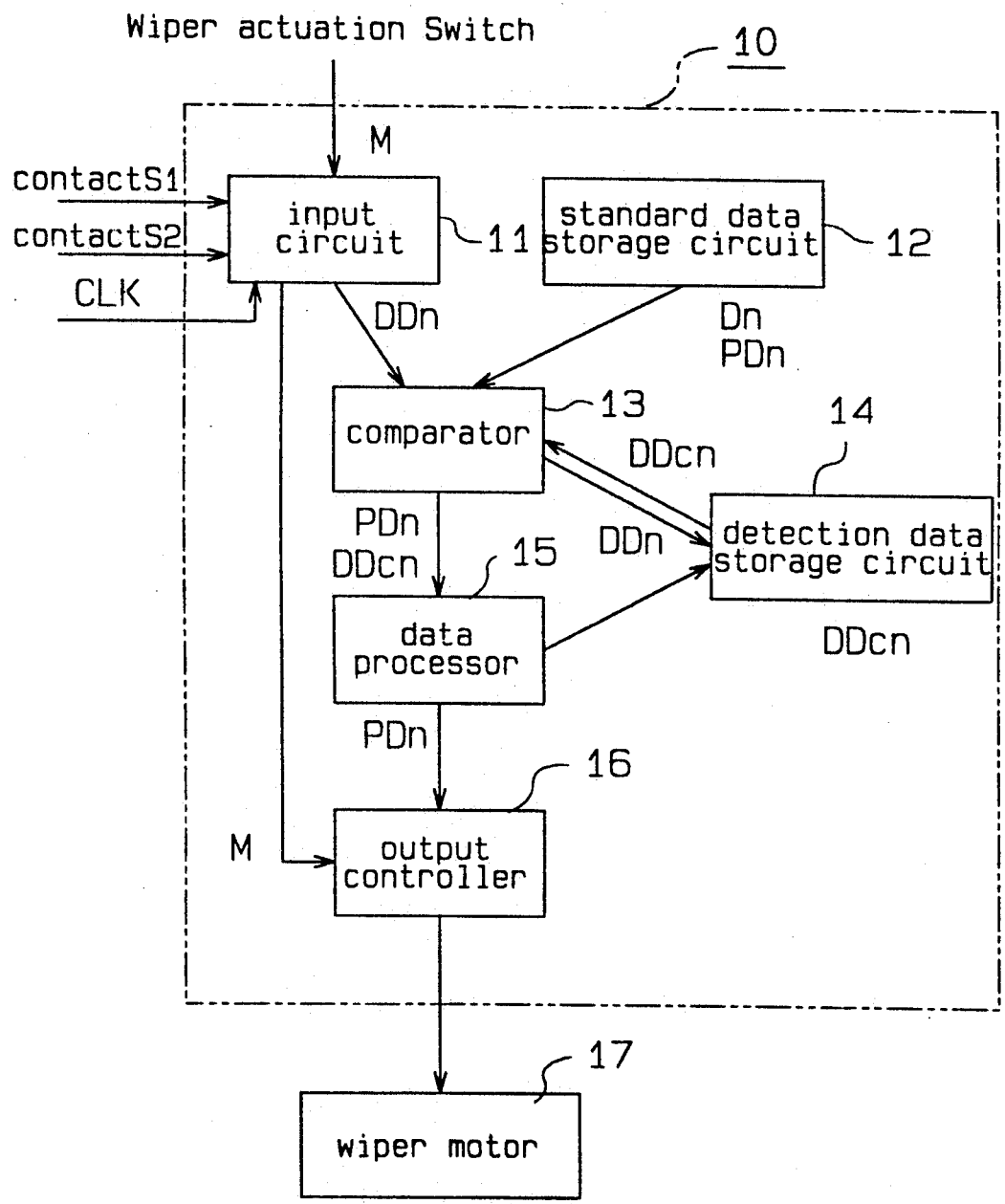
FIG. 1 is a block diagram of a wiper control system which is constructed according to the present invention.
Figure 12:
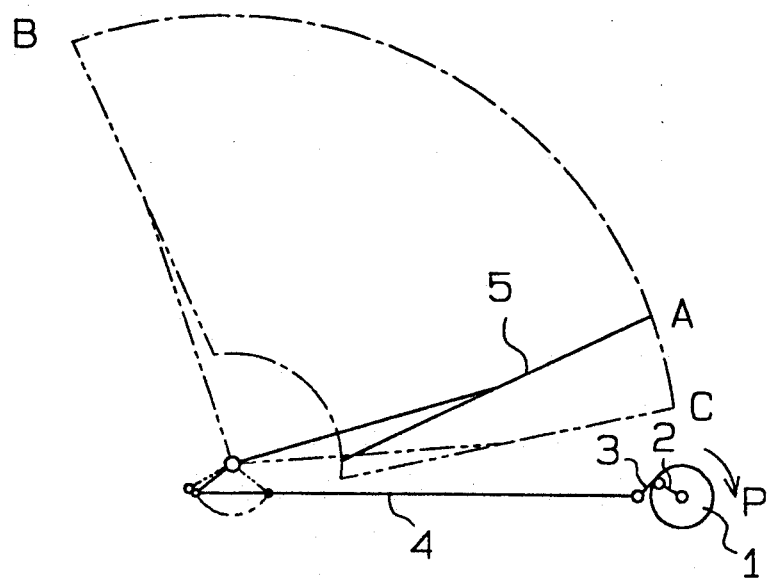
FIG. 12 is a schematic diagram illustrating the wiper in an intermittent stop position.
Figure 13:
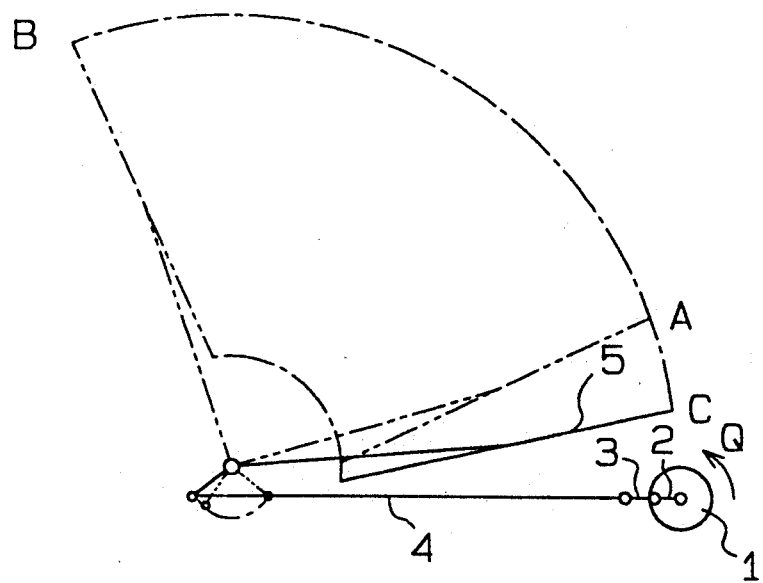
FIG. 13 is another schematic diagram illustrating the wiper stopped in a retracted position.

The wiper 5 is shown in FIGS. 12 and 13 and is driven by a wiper motor 17 (FIG. 1). The wiper 5 is drivably coupled, via a first crank 2, a second crank 3, a first link 4 and a second link 7, to a gear 1. The gear 1 is drivably coupled to the output shaft of the wiper motor 17.

During the normal or forward actuation of the motor 17, the first and second cranks 3 and 4 are angularly disposed with respect to each other by a crank angle adjusting mechanism (not shown). When the rotation of the motor 17 is reversed, the first and second cranks are held in a substantially aligned position, by the crank angle adjusting mechanism. One crank angle adjusting mechanism that could be used in the present wiper control system is described in U.S. Pat. No. 4,689,535 and Examined Japanese Utility Model Publication No. 2-17957, both of which are incorporated herein by reference.

As the gear 1 rotates in the direction of an arrow P with the normal rotation of the motor 17, the wiper 5 reciprocates between an intermittent stop position A and a reverse position B via the first and second cranks 2 and 3, both held bend, and the first and second links 4 and 7. In this manner, the wiper 5 sweeps the windshield shield.

When the rotation of the motor 17 is reversed, after the wiper 5 has reached the reverse position B, the gear 1 will be rotate in the direction of an arrow Q. While the gear 1 is rotated nearly 180 degrees, the first and second cranks 2 and 3 remain aligned. As a result, the length from the first crank 2 to the first link 4 will be longer than when the cranks 2 and 3 are angularly disposed. Therefore, the wiper 5 passes the intermittent stop position A to reach a retracted position C.

Figures 6, 7:
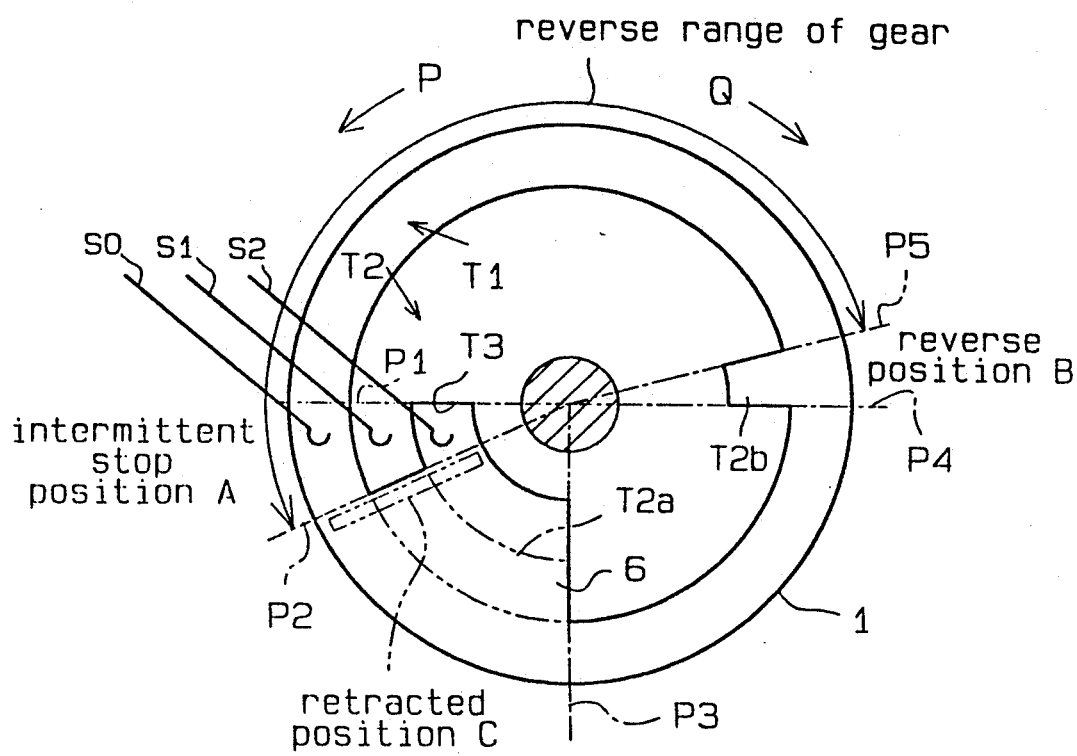
FIG. 6 is a rear plane view of a gear used in the control system of FIG. 1.
FIG. 7 is an example of a table illustrating the relationship between the output signals and wiper position.

To specify the individual positions of the mentioned wiper 5, a detection pattern 6, comprising an electrode plate, is provided on the back of the gear 1 as shown in FIG. 6. This detection pattern 6 includes three concentric tracks T1, T2 and T3. Track T1 extends along the entire peripheral circumference of the gear 1.

Track T2 includes a portion T2a which is concentric with respect to the track T1, and which extends about one quarter (i.e. 90 degrees) of the circumference of the gear 1. The track T1 includes a portion T2b which positioned almost 90 degrees apart from the portion T2a. Both portions T2a and T2b are connected to the track T1. Track T3 is formed inside the track T2, and extends along nearly a quarter of the circumference of the gear 1. Track T3 is connected to the track T2.

Contact levers S0, S1 and S2 contact the tracks T1, T2 and T3 respectively. The contact S0 is grounded, while the contacts S1 and S2 are connected to a controller 10 shown in FIG. 1. When the position of contact lever between the detection pattern 6 and each contact varies with the rotation of the gear 1, predetermined signals are input to the controller 10 from a pair of contacts S1 and S2 in accordance with that variation.

In other words, when the contact levers S2 and S1 contact the detection pattern 6, the contacts S2 and S1 are grounded via the contact S0, thus outputting signals of a "0" or L (low) level. When the contacts S2 and S1 are not in contact with the detection pattern 6, the contacts S2 and S1 output signals of a "1" or H (high) level. The signal switching points on the detection pattern 6 are indicated by P1 to P5.

Figure 8:
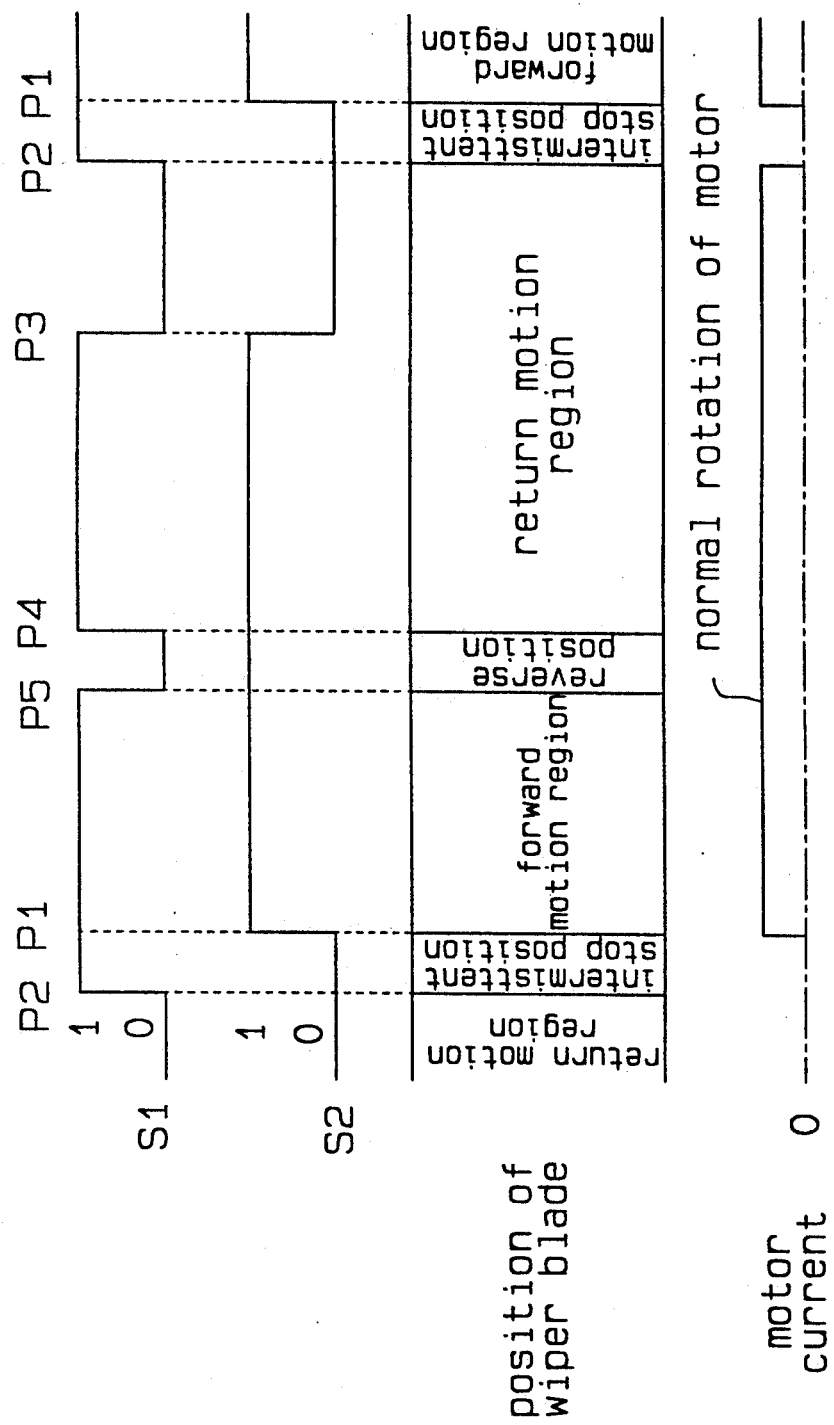
FIG. 8 is a time chart illustrating changes in the output signals, the corresponding position of the wiper blade, and the operational state of the motor.

The time-dependent transition of the detection signal when the gear 1 is rotated in the direction of the arrow P will be described below with reference to FIGS. 6 and 8. As FIG. 6 shows the back of the gear 1, the directions of the arrows indicating the rotational directions are opposite to those in FIGS. 12 and 13.

With the wiper 5 located at the intermittent stop position A, the contact levers S2 and S1 are positioned between the points P1 and P2. When the gear 1 is further rotated in the direction of the arrow P, and the wiper 5 starts moving toward the reverse position B, the contact levers S2 and S1 pass the point P1. Consequently, the levels of the detection signal will be "1, 1" as shown in FIG. 8. When the wiper 5 reaches the reverse position B thereafter and the contacts S2 and S1 pass the point P5, the levels of the detection signal will be "1, 0".

With the wiper 5 located in a forward motion region from the intermittent stop position A, toward the reverse position B, the contacts S2 and S1 are positioned between the points P1 and P5. While the wiper 5 is located at the reverse position B, the contacts S2 and S1 are positioned between the points P5 and P4.

When the wiper 5 is activated in the reverse direction, in correspondence with the rotation of the gear 1 in the direction of the arrow P, in order to start the reverse or return motion, the contacts S2 and S1 pass the point P4. The levels of the detection signal will then be "1, 1".

When the wiper 5 completes its return motion and reaches the intermittent stop position A again, the levels of the detection signal from the contacts S2 and S1 will be "0, 1". With the wiper 5 returning from the reverse position B toward the intermittent stop position A, the contact levers S2 and S1 are positioned between the points P4 and P2. While the wiper 5 is located at the intermittent stop position A, the contacts S2 and S1 come between the points P2 and P1.

When the contacts S2 and S1 pass the point P3 during the return action of the wiper 5, the levels of the detection signal will be "0, 0". This signal is ignored by the controller 10 when the motor 17 is activated in the forward direction.

Figure 9:
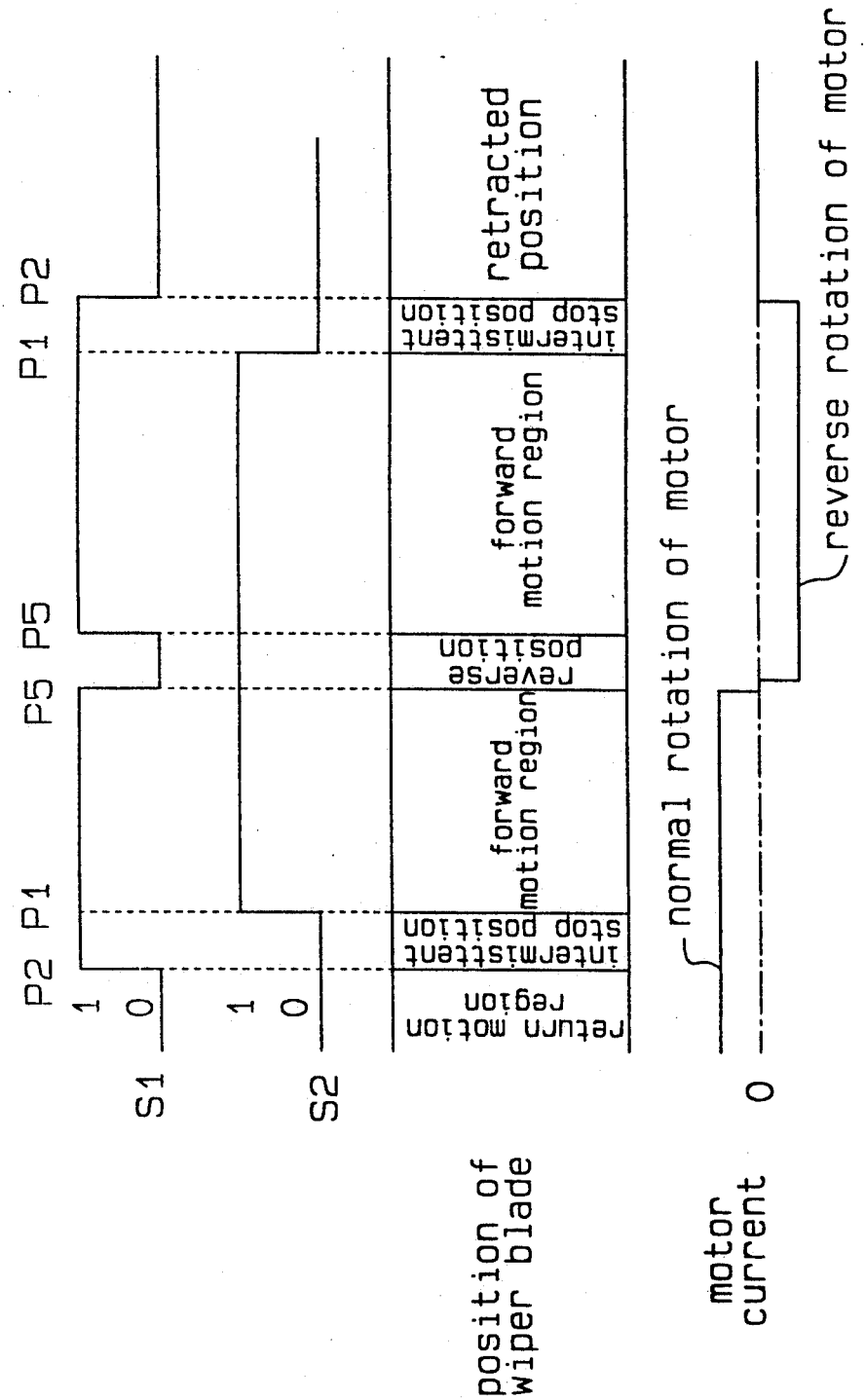
FIG. 9 is a time chart illustrating changes in the output signals, the corresponding position of the wiper blade, and the operational state of the motor.

In retracting the wiper 5, after it has reached the reverse position B with the forward rotation of the motor 17, the rotation of the motor 17 will be reversed. As shown in FIGS. 6 and 9, therefore, the contact levers S2 and S1 pass the point P5 again, at the beginning of the reverse cycle of the motor 17. The levels of the detection signal will then be "1, 1".

When the gear 1 is rotated almost 180 degrees in the direction of the arrow Q, after the reverse rotation of the motor 17 has started, the contacts S2 and S1 pass the point P2 and the levels of the detection signal will be "0, 0". As the motor 17 is running in the reverse direction at this point, the controller 10 determines this detection signal as indicating the retraction of the wiper 5. In response to that signal, the controller 10 stops driving the motor 17, and causes the wiper 5 to go beyond the intermittent stop position A, to stop at the retracted position C.

As described above, the wiper drive control system can detect, by means of the contact levers S2 and S1, the location of wiper 5.

The contact levers S0, S1 and S2 are installed so as to slidably contact the tracks T1, T2 and T3 of the detection pattern 6. When the gear 1 is rotated in the direction of the arrow P, and passes the point P3, the contacts S2 and S1 might not accurately correspond to the tracks T3 and T2, due to some installation, manufacturing or like errors. In such a case, the levels of the detection signal will not be "0, 0" simultaneously. For instance, the contact S2 may pass the point P3 before the contact S1, as shown in FIG. 10, or the contact S1 may pass the point P3 before the contact S2 as shown in FIG. 11.

Figure 10:
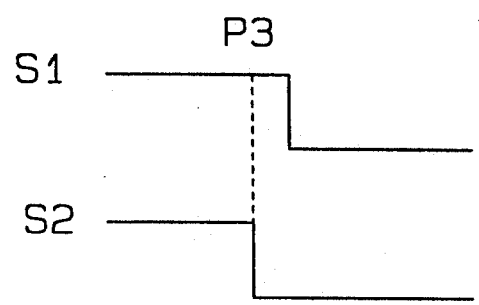
FIG. 10 is a time chart illustrating the state in which a contact lever S2 in the system of FIG. 1, has passed a reference point P3 shown in FIG. 6, prior to a contact lever S1.

As shown in FIG. 10, therefore, the level of the detection signal of the contact S2 remains "0", and the level of the detection signal of the contact S1 temporarily becomes "1", until both contacts S2 and S1 pass the point P3. Therefore, the detection signals having the same level when both contacts S2 and S1 pass the point P2 will temporarily be output in error.

Figure 11:
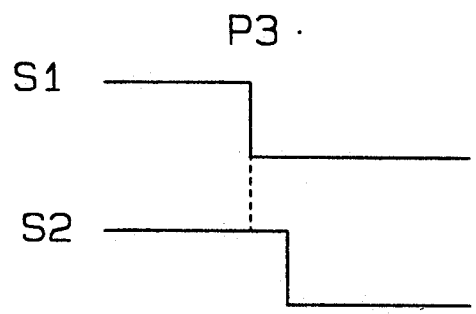
FIG. 11 is a time chart illustrating the state in which the contact lever S1 in the system of FIG. 1, has passed the reference point P3, prior to the contact lever S2.

As shown in FIG. 11, the level of the detection signal of the contact S2 remains "1", and the level of the detection signal of the contact S1 becomes "0", until both contacts S2 and S1 pass the point P3. Therefore, the detection signals having the same level when both contacts S2 and S1 pass the point P5 will temporarily be output in error.

For illustration purposes, during the forward rotation of the motor 17, the contact levers S2 and S1 pass the point P3, when the wiper 5 is in the forward region, the detection signal corresponding to the point P5 or the point P2 is erroneously output. The controller 10 then erroneously judges from the detection signal that the wiper 5 has reached the reverse position B or the intermittent stop position A. This may lead to malfunction in the operation of the wiper. For instance, the wiper 5 might be caused to retract, or to stop its sweeping action in the return region. This malfunction can be avoided by using the present design.

As shown in FIG. 1, the detection signals from the contact levers S2 and S1 are input to an input circuit 11 of the controller 10, and are synchronized with a clock signal CLK. A wiper actuation switch SW could be manipulated to set a plurality of modes for the wiper action, such as intermittent mode, slow mode, fast mode and stop mode. In accordance with the manipulation of the switch SW, a mode signal M corresponding to the selected mode is input to the input circuit 11. This mode signal M is also output to an output controller 16. stored a plurality of standard pattern data D1 to D8 (FIGS. 2 and 3). Each of the standard pattern data D1-D8 is formed of the time-sequence combination of the signals to be detected by the contact levers S2 and S1. Each of the data D1-D8 includes three detection signals to be detected: a detection signal DDn, and two preceding detection signals DDn−1 and DDn−2. The standard pattern data D1 to D8 are classified into the data D1 to D5 based on the rotation of the gear 1 in the direction of the arrow P, as shown in FIG. 2, and the data D6 to D8 are based on the rotation of the gear 1 in the reverse direction, i.e. in the direction of the arrow Q, as shown in FIG. 3. Position data PD1 to PD5 are used for determining the current position of the wiper 5 in association with the pattern data D1-D5, and are also stored in the data storage circuit 12.

Referring now to the standard pattern data D4 in FIG. 2, suppose that the output signals from the contact levers S2 and S1 vary from "0, 1" to "1, 1" and then to "1, 0" while the gear 1 is rotated in the direction of the arrow P. In this case, it is determined, based on the position data PD4 (FIG. 2) that the wiper 5 has properly reached the reverse position B.

Referring now to the standard pattern data D6 in FIG. 3, and suppose that the output signals from the contact levers S2 and S1 vary from "1, 1" to "1, 0" and then to "1, 1", while the gear 1 is rotated in the direction of the arrow Q. In this case, it is determined based on the position data PD6 in FIG. 3 that the wiper 5 has properly reached the forward region.

Note that the standard pattern data D5 with the motor 17 running in the normal direction is the same as the standard pattern data D6 with the motor 17 running in the reverse direction. Because of the difference in the rotational direction of the motor 17, the position data corresponding to those pattern data D5 and D6 are treated as being different from each other, and are thus given different reference numerals "PD5" and "PD6".

As shown in FIG. 1, one detection signal DDn which is detected by the contact levers S2 and S1 is input to a comparator 13, via the input circuit 11.

In a detection data storage circuit 14 shown in FIG. 1, detection pattern data including multiple detection signals detected by the contact levers S2 and S1 are stored, via the input circuit 11 and the comparator 13, in a readable/writable manner. As indicated by STEP1 in FIG. 4, of the multiple detection signals detected earlier, the last detection signal and the detection signal preceding if are stored as the detection pattern data, respectively, in two signal storage areas 14a and 14b, for storing the detection signals DDn−1 and DDn−2.

The comparator 13 stores the detection signal DDn in a storage area 14c, of the detection data storage circuit 14, to combine this data with the previously stored two detection signals DDn−1 and DDn−2 in a time-sequential manner for forming a combined detection pattern data DDc1 including three detection signals. Further, the comparator 13 compares this combined detection pattern data DDc1 with the aforementioned individual standard pattern data D1-D8 to determine if the data DDc1 matches with one of the standard pattern data D1-D8.

When the combined detection pattern data DDc1 matches one of the standard pattern data D1-D8, the comparator 13 determines that there is no error in the detection operation. At this time, the comparator 13 sends the combined detection pattern data DDc1 and the wiper position data PD1-PD8 which corresponds to one of the pattern data D1-D8 to a data processor 15.

When the combined detection pattern data DDc1 does not coincide with any of the standard pattern data D1-D8, the comparator 13 determines that an error has occurred. The comparator 13 then deletes the detection signal originating from the detection operation, and waits for the next detection signal input.

The data processor 15 outputs one of the wiper position data PD1-PD8 among the data sent from the comparator 13 to the output controller 16. Based on the received data PD1-PD8 and the mode signal M, the output controller 16 drives the wiper motor 17.

Figure 4:
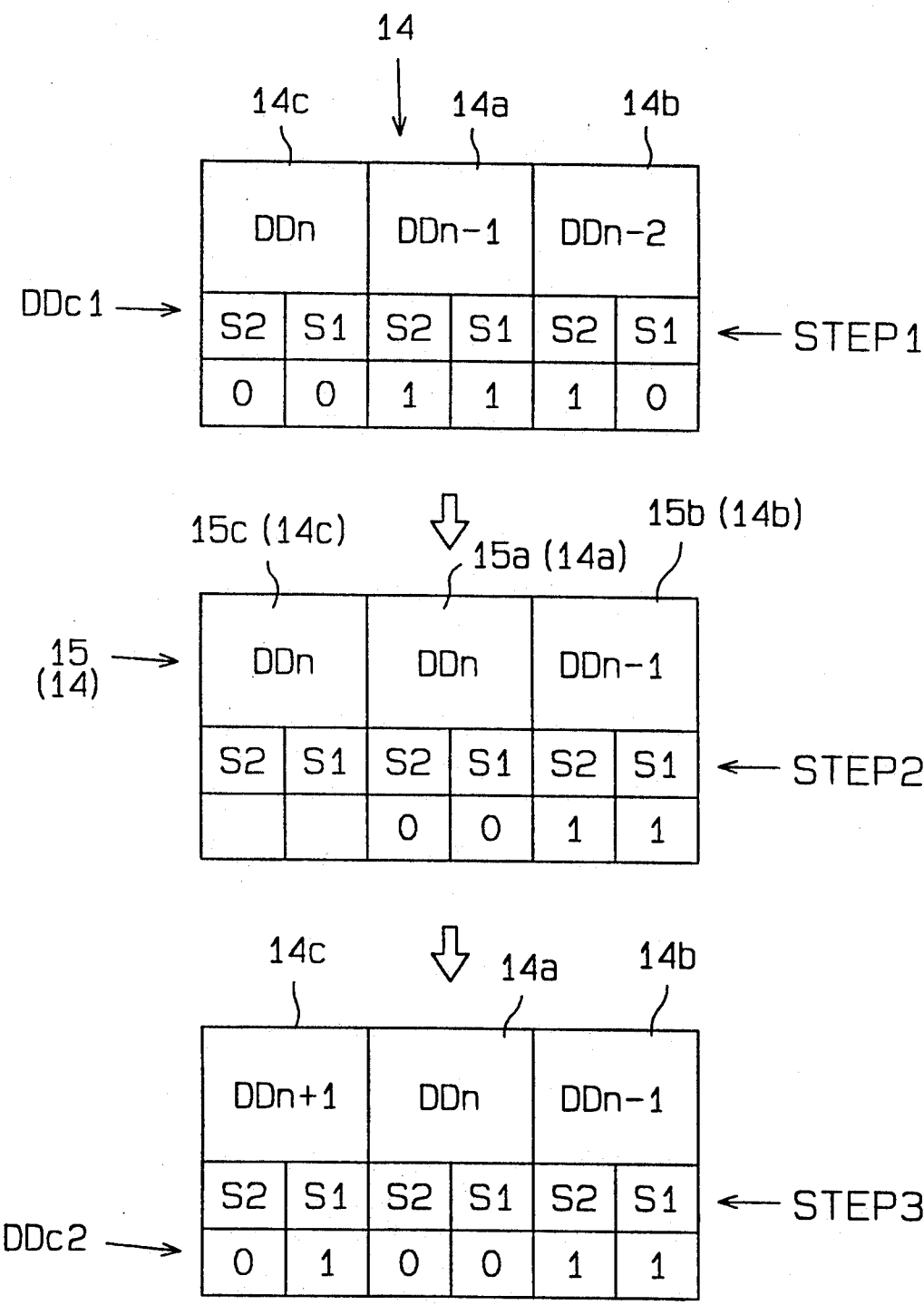
FIG. 4 is an example, in a tabular form, of the order for handling a time-sequential detection pattern.

As indicated by STEP1 and STEP2 in FIG. 4, the data processor 15 stores the detection signal DDn−1, i.e. the signal preceding DDn, which is contained in the combined detection pattern data DDc1 from the comparator 13, into a storage area 15b. The data processor 15 then stores anew the detection signal DDn detected this time as the detection signal DDn−1, into a storage area 15a. At this time, the detection signal DDn−2 will be erased.

As shown in STEP3 in FIG. 4, the two detection signals DDn and DDn−1 are respectively sent form the data processor 15 to the storage areas 14a and 14b of the detection data storage circuit 14. When the latest detection signal DDn+1 is input to the comparator 13, the comparator 13 reads both the detection signals DDn and DDn−1 from the detection data storage circuit 14. The comparator 13 then combines the latest detection signal DDn+1 with the two detection signals DDn and DDn−1 to form a new combined detection pattern data DDc2 again. This pattern data DDc2 will replace the previously-stored pattern data DDc1 in the detection data storage circuit 14.

When the mode is set to the intermittent mode through the wiper actuation switch SW, the mode signal M will be input to the input circuit 11 of the controller 10. In response to the mode signal M, the output controller 16 causes the wiper motor 17 to rotate in order to permit the wiper 5 to move intermittently. The gear 1 then rotates in the direction of the arrow P, so that the wiper 5 starts the sweeping action from the intermittent stop position A, with the first and second cranks 2 and 3 being angularly disposed. The wiper 5 will sequentially pass through the forward region and the reverse position as shown in FIG. 8.

When the wiper 5 reaches the return region and the point P3 of the detection pattern 6 properly passes the contact levers S2 and S1, a detection signal DDn "0, 0" will be input to the input circuit 10 from the contact levers S2 and S1. This detection signal DDn is then sent to the comparator 13 from the input circuit 11. The comparator 13 then reads the previous detection signals $DDn-1$ and $DDn-2$, from the detection data storage circuit 14. The levels of the detection signals $DDN-1$ and $DDn-2$ will be "1, 1" and "1, 0", as shown in FIGS. 4 and 8.

The comparator 13 combines both detection signals $DDn-1$ and $DDn-2$ with the last detection signal DDn which is detected in a time-sequential manner, and forms a combined detection pattern data DDc1, as indicated in STEP1 in FIG. 4 The comparator 13 determines if the prepared data DDc1 matches one of the standard pattern data D1-D8 in the standard data storage circuit 12. As the combined detection pattern data DDc1 matches the standard pattern data D1, the comparator 13 determinoc that the point r3 has been detected by the contact levers S2 and S1.

The comparator 13 sends the combined detection pattern data DDc1 and the associated wiper position data PD1 respectively, from the detection data storage circuit 14 and the standard data storage circuit 12 to the data processor 15. The wiper position data PD1 indicate that the wiper 5 has reached the position corresponding to the point P3.

The wiper position data PD1 is output from the data processor 15 to the output controller 16. As a result, the output controller 16 recognizes that the wiper 5 has passed the point P3, and continues the control for the normal rotation of the motor 17.

As indicated by STEP2 in FIG. 4, the data processor 15 stores anew the previous detection signal $DDn-1$ which is sent from the comparator 13 to the storage area 15b, as a detection signal $DDn-2$, and stores anew the current detection signal DDn as $DDn-1$, into the storage area 15a. Accordingly, the detection pattern data will be formed and will include two detection signals to which a detection signal $DDn+1$ (to be detected next) can be added. The data processor 15 will then store this detection pattern data into the detection data storage circuit 14.

Thereafter, the wiper 5 reaches the intermittent stop position A as shown in FIG. 12 and the point P2 passes the contact levers S2 and S1. Consequently, a detection signal of "0, 1" will be input, via the contact levers S2 and S1 and the input circuit 11, to the comparator 13. At this time, the comparator 13 reads out detection pattern data, as indicated in STEP2 of FIG. 4, previously stored in the detection data storage circuit 14, and combines it was the last detection signal $DDn+1$. Accordingly, the detection pattern data DDc2 indicated in STEP3 in FIG. 4 will be formed anew.

This combined detection pattern data DDc2 matches the standard pattern data D2. The comparator 13 therefore determines that the wiper 5 has reached the intermittent stop position A, and outputs the wiper position data PD2 and the combined detection pattern data DDc2 to the data processor 15. In response thereto, the data processor 15 will only output the wiper position data PD2 to the output controller 16.

The output controller 16 recognizes that the wiper 5 is at the intermittent stop position A, and stops the current supply to the wiper motor 17 to cause the motor 17 to stop for a predetermined period of time. After which period, the output controller 16 will resume supplying power to the wiper motor 17. Then, the gear 1 is rotated again in the direction of the arrow P, and actuates the wiper 5.

On the other hand, suppose that the contact lever S1 passes point P3 before passing the contact lever S2, due to by malfunction. The levels of the detection signal will then be "1, 0". This detection signal has the same level as that of the detection signal when the contact lever S2 and S1 pass the point P5, and is used to determine whether the wiper 5 is at the reverse position B. Even if this signal were combined with the detection signal $DDn-1$ ("1, 1") and the detection signal $DDn-2$ ("1, 0"), as indicated in STEP1 (FIG. 5), the resultant data will match none of the standard pattern data D1-D8. The comparator 13 thus considers the detection signal as an error signal, as indicated in STEP2 (FIG. 5). As a result, even if the point P3 were erroneously detected by the contacts S2 and S1, the output controller 16 would not drive the wiper motor 17 based on the error signal.

When contact lever S1 passes the point P3 later, a detection signal with the normal level of "0, 0" will be acquired. Naturally, the combined detection pattern data containing this detection signal indicated in STEP3 (FIG. 5) matches the standard pattern data D1. The comparator 13 thus judges that the point P3 has passed the contact levers S2 and S1 and the wiper 5 has reached the position corresponding to the point P3. The wiper will then be operated based on the normal detection operation.

When the operation stop signal is input by the manipulation of the wiper actuation switch SW during the movement of the wiper 5, the output controller 16 will control the wiper motor 17 to retract the wiper. In other words, the output controller 16 detects the wiper 5 on the reverse position B (point P5), and reverses the rotation of the wiper motor 17, in order to retract the wiper 5 to the retracted position C.

Suppose that, before the wiper retracting operation, the contact lever S1 has passed the point P3 sooner than the contact lever S2 due to malfunction, with the rotation of the gear 1, in the direction of the narrow P. Then, the levels of the detection signal from the contact levers S2 and S1 will be "1, 0". This detection signal indicates that the wiper 5 has reached the reverse position B, although the wiper 5 has actually passed the position corresponding to the point P3. This will provide an erroneous detection signal. The comparator 13 ignores the detection signal of 1, 0", and determines the position of the wiper 5 based on the proper signal to be input subsequently.

Thereafter, a similar process to that described above will be executed every time the point P2 and point P1 pass the contact levers. When the wiper 5 reaches the reverse position B, and the point P5 passes the contact levers S2 and S1, the level of the detection signal will be "1, 0". This detection signal is input via the input circuit 11 to the comparator 13. Then, the comparator 13 reads out the two previously detected signals ("1, 1") corresponding to the point P1, ("0, 1") corresponding to the point P2, from the detection data storage circuit 14. The comparator 13 then combines both signals with the latest detection signal, to form the combined detection pattern data DDc3.

The comparator 13 then determines whether this combined detection pattern data DDc3 matches one of the standard pattern data D1–D8. In this case, the data DDc3 matches the standard pattern data D4. Accordingly, the comparator 13 determines that the contact levers S2 and S1 have passed the point P5, and that the wiper 5 is at the reverse position B. As a result, the comparator 13 sends the combined detection pattern data DDc3 and the wiper position judging data PD4 to the data processor 15.

Furthermore, the data processor 15 outputs the wiper position data PD4 to the output controller 16. In response to the data PD4, the output controller 16 stops the wiper motor 17, and then reverses the wiper motor 17 in about 0.1 sec. Consequently, the gear 1 will rotate in the direction of the arrow Q and the first crank 2 and second crank 3 will be aligned, as shown in FIG. 13.

By the rotation of the gear 1 in the direction of the arrow Q, the contact levers S2 and S1 sequentially pass the points P5, P1 and P2 in the named order, and the wiper 5 passes the forward region and the intermittent stop position A, before reaching the retracted position C. Every time the contact levers S1 and S2 pass each of the points P5, P1 and P2, the controller 10 determines whether or not the wiper 5 has normally passed the position corresponding to each point P5, P1 or P2, based on the detection signal corresponding to that point.

In particular, when the point P2 passes the contact levers S2 and S1, the level of the detection signal will be "0, 0". At this time, it is determined, through the above-described operation of the controller 10, that the wiper 5 is at the retracted position C. As a result, the output controller 16 interrupts the electric current to the wiper motor 17 and causes it to stop. As a result, the wiper 5 will go beyond the intermittent stop position A to stop at the retracted position C.

As described in details above, according to this embodiment, the last detection signal is combined with two preceding time-sequential detection signals, to produce combined detection pattern data. This pattern data is compared with the corresponding standard pattern data D1–D8. Based on the result of the comparison, it is determined whether or not the last detection signal is correct or erroneous and the wiper motor 17 is controlled accordingly. Even if a malfunction occurs in detecting a signal corresponding to the shape of the detection pattern 6 by the contact levers S2 and S1, therefore, the error in controlling the wiper 5 is significantly reduced.

The correct detection operation can also be accomplished by providing a detection pattern which provides the same signal, for different positions of the wiper. This can prevent the control apparatus from becoming too complicated and large. Further, if the surface of the detection pattern 6 were stained, and an erroneous detection signal might be input to the input circuit 11 from the contact levers S2 and S1, the error in controlling the wiper 5 is significantly reduced.

Although the last detection signal and the two preceding detection signals are combined to form combined detection pattern data, the number of the detection signals to be combined with or compared to the last detection signal could vary according to the application.

What is claimed is:

1. A wiper control system for controlling the movement of a wiper, comprising:
    (a) a motor having an output shaft selectively drivable in one of a normal and reverse direction, for driving the wiper;
    (b) a wiper position detector, including a plurality of detector contacts, for providing output detection signals indicative of the position of the wiper;
    (c) storage means for inputting said output detection signals and storing combinations of said output detection signals in a time-sequential order;
    (d) data generation means for generating and storing basic data formed of predetermined time-sequential combinations of said output detection signals to be detected; and
    (e) indexing means for comparing said combinations of said output detection signals stored in said storage means with combinations in said basic data which correspond to said combinations of said output detection signals, and for indexing the relative positions of the wiper resulting from the comparison.

2. The wiper control system according to claim 1, wherein said output detection signals include signals relating to a sweeping range for the wiper, and to a retracted position outside said sweeping range.

3. The wiper control system according to claim 1, wherein said wiper position detector includes a conductive pattern plate;
    wherein said detector contacts come into relative contact with said pattern plate; and
    wherein said output detection signals are indicative of said relative contact between said pattern plate and said detector contacts.

4. The wiper control system according to claim 1, wherein each of said detection data stored in said storage means includes a combination of three detection signals.

5. The wiper control system according to claim 1, wherein each of said combinations of said output detection signals generated by said data generating means includes three detection signals.

6. A wiper control system for controlling the movement of a wiper, comprising:
    (a) a rotatable shaft for selectively driving the wiper in one of a normal and reverse direction;
    (b) a wiper position detector, including a plurality of detector contacts, for providing output detection signals indicative of the position of the wiper;
    (c) storage means for inputting said output detection signals and storing combinations of said output detection signals in a time-sequential order;
    (d) data generation means for generating and storing basic data formed of predetermined time-sequential combinations of said output detection signals to be detected;
    (e) indexing means for comparing said combinations of said output detection signals stored in said storage means with combinations in said basic data which correspond to said combinations of said output detection signals, and for indexing the relative positions of the wiper resulting from the comparison; and
    (f) control means for controlling the movement of the wiper in relation to said indexed relative positions.

7. The wiper control system according to claim 6, wherein said shaft is driven by a motor.

* * * * *